US008214865B2

(12) United States Patent
Lee

(10) Patent No.: US 8,214,865 B2
(45) Date of Patent: Jul. 3, 2012

(54) VIDEO SIGNAL RECEIVING APPARATUS, DISPLAY DEVICE, DISPLAY SYSTEM, AND INFORMATION UPDATING METHOD OF DISPLAY SYSTEM

(75) Inventor: Chang-jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 11/772,260

(22) Filed: Jul. 2, 2007

(65) Prior Publication Data

US 2008/0092165 A1    Apr. 17, 2008

(30) Foreign Application Priority Data

Oct. 13, 2006    (KR) .................. 10-2006-0099918

(51) Int. Cl.
*H04N 7/18*    (2006.01)
(52) U.S. Cl. ............... 725/80; 725/78; 725/81; 725/85; 725/139; 345/1.1
(58) Field of Classification Search .............. 725/81, 725/29, 78, 85, 139; 345/1.1–2.1, 3.4; 348/706, 348/734; 710/8
See application file for complete search history.

(56) References Cited

U.S. PATENT DOCUMENTS

| | | | | |
|---|---|---|---|---|
| 6,025,869 | A * | 2/2000 | Stas et al. ................. | 725/28 |
| 6,493,874 | B2 * | 12/2002 | Humpleman ............... | 725/78 |
| 2002/0039393 | A1 * | 4/2002 | Shibata et al. ............. | 375/316 |
| 2005/0235329 | A1 * | 10/2005 | Karaoguz et al. ........... | 725/81 |
| 2005/0251827 | A1 | 11/2005 | Ellis et al. | |
| 2005/0265267 | A1 | 12/2005 | Hwang | |
| 2006/0117115 | A1 * | 6/2006 | Jo et al. .................. | 710/8 |
| 2006/0117371 | A1 | 6/2006 | Margulis | |

FOREIGN PATENT DOCUMENTS

| | | | |
|---|---|---|---|
| JP | 2005-303628 A | | 10/2005 |
| KR | 10-2003-0063843 | * | 3/2005 |
| KR | 10-2005-0028637 A | | 3/2005 |
| KR | 10-2005-0120064 A | | 12/2005 |
| KR | 10-2006-0028143 A | | 3/2006 |
| KR | 10-2006-0059354 A | | 6/2006 |
| WO | 2006/093741 A1 | | 9/2006 |

OTHER PUBLICATIONS

Communication issued Jan. 19, 2011 by the Korean Intellectual Property Office in counterpart Korean Patent Application No. 10-2006-0099918.
Communication, dated Dec. 5, 2011, issued by the European Patent Office in corresponding European Application No. 07112682.5.

* cited by examiner

*Primary Examiner* — Kristine Kincaid
*Assistant Examiner* — Sumaiya A Chowdhury
(74) *Attorney, Agent, or Firm* — Sughrue Mion, PLLC

(57) ABSTRACT

A video signal receiving apparatus, includes: a plurality of receiving parts which receive a video signal; a plurality of communicating parts which transmit the video signal to a plurality of external display devices, and transmit and receive control data for changing a display property of the video signal and a setting of the display devices to and from the external display devices; and a control part which controls the communicating parts to transmit the video signal received by the receiving part to the external display devices, and to receive the control data and to transmit a signal which controls the corresponding display devices if the control data is input from the external display devices.

22 Claims, 4 Drawing Sheets

VIDEO SIGNAL RECEIVING APPARATUS, DISPLAY DEVICE, DISPLAY SYSTEM, AND INFORMATION UPDATING METHOD OF DISPLAY SYSTEM

CROSS-REFERENCE TO RELATED APPLICATIONS

This application claims priority from Korean Patent Application No. 10-2006-0099918, filed on Oct. 13, 2006, in the Korean Intellectual Property Office, the disclosure of which is incorporated herein by reference.

BACKGROUND OF INVENTION

1. Field of Invention

A video signal receiving apparatus, a display device, a display system and an information updating method of a display system consistent with the present invention relate to a change of property information for displaying video.

2. Description of the Related Art

Generally, a display device outputs video by a video signal. A digital television (TV) system, may be one of a separate type system in which a set top box receiving the video signal is separated from a TV processing and displaying the video signal, and an integral type system in which the set top box and the TV are coupled together. In the separate type digital TV system, a plurality of TVs can receive video signal through a single set top box, thereby respectively displaying independent videos.

However, in the separate type digital TV system, since the set top box one-sidedly transmits a broadcast signal to the TV, it is impossible for the set top box to receive property information which is contained in the TV for displaying video.

Also, in order to easily control a property of an external TV, it is necessary to allow a first TV to remotely change property of a second TV including a viewer grade, a power on/off, etc.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display device, a display system and an information updating method of a display system transmitting a video signal to a plurality of display devices through a single video signal receiving apparatus, and easily controlling various properties of an external remote display device.

According to an aspect of the present invention there is provided a video signal receiving apparatus, comprising: a plurality of receiving parts which receive a video signal; a plurality of communicating parts which transmit the video signal to a plurality of external display devices, and transmit and receive control data for changing a display property of the video signal and a setting of the display devices to and from the external display devices; and a control part which controls the communicating parts to transmit the video signal received by the receiving part to the external display devices, and to receive the control data and to transmit a signal which controls the corresponding display devices if the control data is input from the external display devices.

The communicating parts may comprise a wireless local network area (LAN) part to transmit and receive the control data.

The video signal receiving apparatus may further comprise: a display part; a user interface generating part which generates a user interface for an input of the control data and a display of a state of the display part; and a video processing part which performs a video process to the user interface generated by the user interface generating part, wherein the control part controls the video processing part so that the control data can be input through the user interface.

The video signal receiving apparatus may further comprise an indicating part, wherein the control part controls the indicating part to indicate a permission for view according to a view rate among the display property of the video signal which is displayed in each external display device.

According to an aspect of the present invention there is provided a display device, comprising: a display part; a communicating part which receives a video signal from a video signal receiving apparatus, and transmits and receives control data for changing a display property of the video signal and a setting of the display part to and from the video signal receiving apparatus; a video processing part which performs a video process to the received video signal to output video in the display part; and a control part which controls the communicating part and the video processing part to transmit the input control data to the video signal receiving apparatus if the control data is input, and to perform a video process depending on the control data if the control data input from an external display device is received from the video signal receiving apparatus.

The communicating part may comprise a wireless local network area (LAN) part to transmit and receive the control data.

The display device may further comprise a user input part, wherein the control part controls the user input part to receive the control data.

The display device may further comprise a user interface generating part which generates a user interface for an input of the control data, wherein the control part enables the control data to be input through the user interface.

The control part may enable an input of the control data according to information on an identifier (ID) and a password through the user input part.

The display device may further comprise an indicating part, wherein the control part controls the indicating part to indicate a permission for view according to a view rate among the display property of the video signal which is displayed in each external display device.

According to still another aspect of the present invention there is provided a display system, comprising: a video signal receiving apparatus; and a plurality of display devices.

According to still another aspect of the present invention there is provided a information updating method of a display system comprising a video signal receiving apparatus, and a plurality of display devices comprising a display part; comprising: being input by control data to change a display property of a video signal from a user in the display devices; receiving the input control data from the display devices in the video signal receiving apparatus; and transmitting the received control data to the corresponding display devices from the video signal receiving apparatus.

The control data may be transmitted and received by means of a wireless local network area.

The inputting of the control data may further comprise displaying a user interface for input of the control data, wherein the control data is input through the user interface.

The inputting of the control data may further comprise inputting by information on a user ID and a password, wherein the control data is input according to the input information on the ID and password.

BRIEF DESCRIPTION OF THE DRAWINGS

The above and/or other aspects of the prevent invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
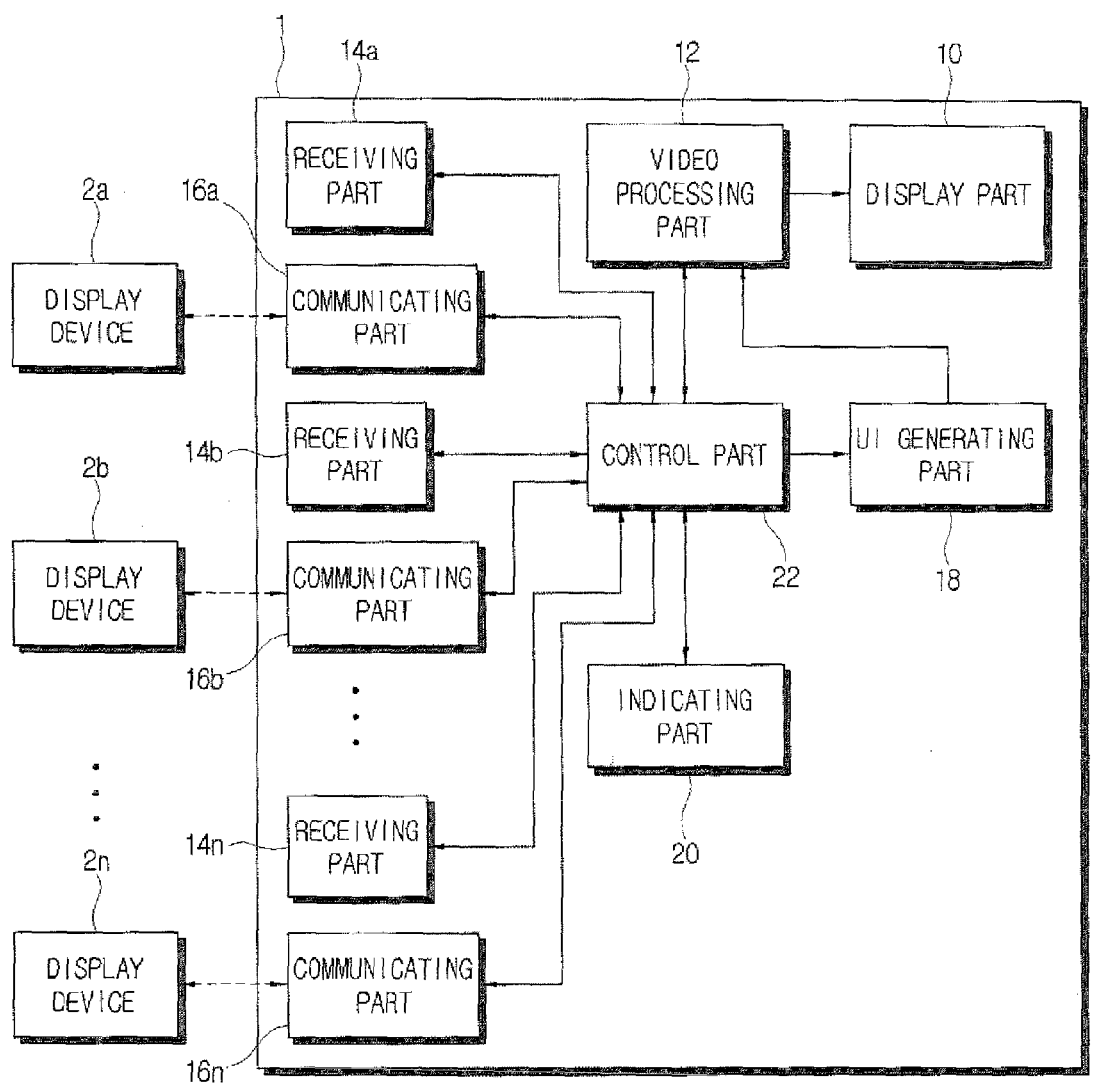
FIG. 1 is a block diagram illustrating a configuration of a video signal receiving apparatus according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, a video signal receiving apparatus 1 according to an exemplary embodiment of the present invention comprises a display part 10, a video processing part 12, a plurality of receiving parts 14a to 14n, a plurality of communicating parts 16a to 16n, a user interface (UI) generating part 18, an indicating part 20 and a control part 22. The video signal receiving apparatus 1 may comprise a set top box.

The display part 10 displays video with respect to a predetermined video signal. The display part 10 comprises a liquid crystal display (LCD) disposed at a front side of the video signal receiving apparatus 1 so that a user can easily notice property information of a plurality of display devices 2a to 2n for displaying video. The display part 10 may be provided as a plurality of display parts to notice the property information of each display device 2a to 2n.

The video processing part 12 performs a video process so that the display part 10 can display property information of video displayed by the display device 2a. Accordingly, since the video processing part 12 performs the video process for displaying the property information of the display device 2a in the display part 10 without performing a video process for a video signal received by the receiving part 14a, the video processing part 12 can become more simplified than a video processing part 32 provided to the display device 2a.

The receiving part 14a receives a broadcast signal of a stream type such as a Moving Picture Experts Group (MPEG) Transport Stream (TS), etc. The receiving part 14a may comprise a tuner, and may be provided as many in number as the number of the display devices 2a connected with the video signal receiving apparatus 1. Specifically, there may be n display devices 2a and n receiving parts 14a, wherein n is a positive integer. However, if the display device 2a receives and displays an external input video signal, the number of the receiving parts 14a may be less than the number of the display devices 2a.

The communicating parts 16a to 16n transmit and receive a video signal and predetermined data to and from the plurality of display devices 2a to 2n. The communicating part 16a may employ a wireless LAN module, and may be provided as many in number as the number of the display devices 2a connected with the video signal receiving apparatus 1. Specifically, there may be n display devices 2a and n communicating parts 16a, wherein n is a positive integer.

Alternatively, for transmitting and receiving a control data, the communicating part 16a may employ a Bluetooth module, a zigbee module, etc. Also, the communicating part 16a may employ a wire network and other known configurations which can communicatably connect a plurality of electric devices together.

The UI generating part 18 generates a UI for receiving a control data and displaying a state of the display part 10. The UI generated by the UI generating part 18 may be displayed in a plurality of display parts 10 according to control of the control part 22.

The indicating part 20 indicates a permission to view according to a view rate among the properties of the video signal displayed in the plurality of display devices 2a to 2n. The indicating part 20 may comprise a light emitting diode (LED), and may show indication if the view rate of a broadcast signal is not suitable for a user.

The control part 22 controls the communicating part 16b to transmit a video signal received by the receiving part 14a to the external display device 2b, and to receive input control data and transmit a signal for controlling the corresponding display device 2b if the control data is input from the display device 2a. Here, the control data refers to data for changing a property of video displayed in the external display device 2b. Accordingly, the single video signal receiving apparatus 1 can transmit the video signal to the plurality of display devices 2b to 2n, and each display device 2b to 2n can change the property of video displayed in the external display device 2b.

Also, the control part 22 displays the UI generated by the UI generating part 18 in the display part 10 so that the control data for changing the property determined in the external display device 2b can be input. Also, the control data for changing the property of the video displayed in each display device 2b to 2n may be input in the video signal receiving apparatus 1 through a user input part (not shown).

The control part 22 controls the indicating part 20 to emit light if the video signal received by each receiving part 14a to 14n is not suitable for the view rate of a user watching each display device 2a to 2n, thereby easily confirming whether the corresponding view rate of each display device 2a to 2n is permissible or not.

Hereinafter, a display device 2a according to an exemplary embodiment of the present invention will be described by referring to FIG. 2.

Figure 2:
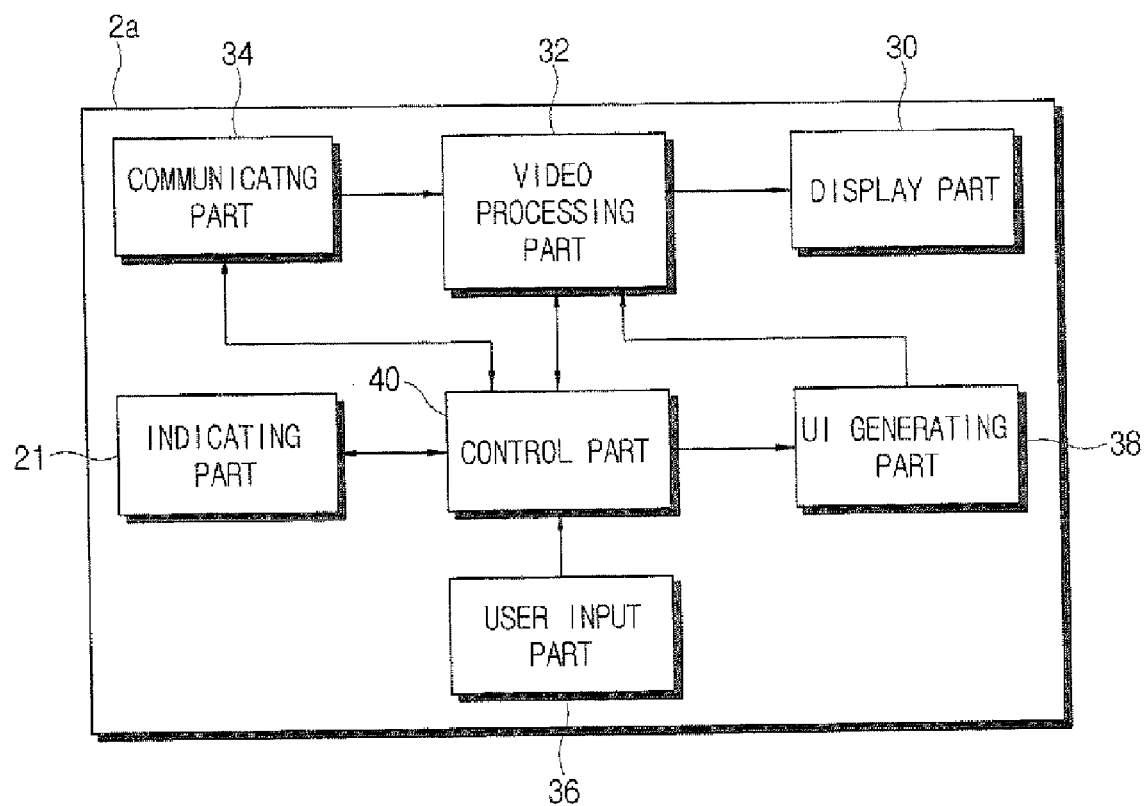
FIG. 2 is a block diagram illustrating a configuration of a display device according to an exemplary embodiment of the present invention.

As shown in FIG. 2, a display device 2a according to an exemplary embodiment of the present invention comprises a display part 30, the video processing part 32, a communicating part 34, a user input part 36, a UI generating part 38, an indicating part 21 and a control part 40. The display device 2a may comprise a digital TV.

The display part 30 displays video based on a video signal processed by the video processing part 32. The display part 30 may comprise a cathode ray tube (CRT), a liquid crystal display (LCD), a plasma display panel (PDP), a digital light processing (DLP), a surface-conduction electron emitter display (SED), a field emission display (FED) or other known configurations.

The video processing part 32 processes a video signal received by the communicating part 34, and displays video in the display part 30. Also, the video processing part 32 receives a UI image generated by the UI generating part 38, and generates an image containing the UI image and displays it in the display part 30 according to control of the control part 40.

The video processing part 32 may perform decoding for extracting video information from an input video signal, scaling for adjusting resolution of a decoded video depending on a property of the display part 30 and a setting of a user, and picture enhancement for enhancing the quality of video, etc.

The communicating part 34 receives a video signal from the video signal receiving apparatus 1, and transmits and receives control data for changing a display property of the video signal to and from the video signal receiving apparatus 1. The communicating part 34 may comprise a wireless LAN module to communicate with the communicating part 16*a* provided to the video signal receiving apparatus 1.

Alternatively, like the communicating part 16*a* provided to the video signal receiving apparatus 1 for transmitting and receiving control data, the communicating part 34 of the display device 2 may comprise a Bluetooth module, a zigbee module, etc. Also, the communicating part 34 may comprise a wire network and other known configurations which can communicatably connect a plurality of electric devices together.

The user input part 36 receives control data from a user. The user input part 36 may be provided to one side of the display device 2*a*, or may comprise a remote controller separately provided.

The UI generating part 38 generates a UI for receiving control data. The UI generated by the UI generating part 38 will be described below. Also, the UI generating part 38 may generate a UI for inputting and changing of information of a user ID and a password.

The control part 40 controls the communicating part 34 and the video processing part 32 to transmit input control data to the video signal receiving apparatus 1 if the control data is input by a user, and to perform a video process according to control data if the control data input from the external display device 2*a* is received from the video signal receiving apparatus 1.

Hereinafter, operations of the control part 22 of a video signal receiving apparatus 1 and the control part 40 of the display device 2*a* will be described by referring to FIG. 3.

Figure 3:
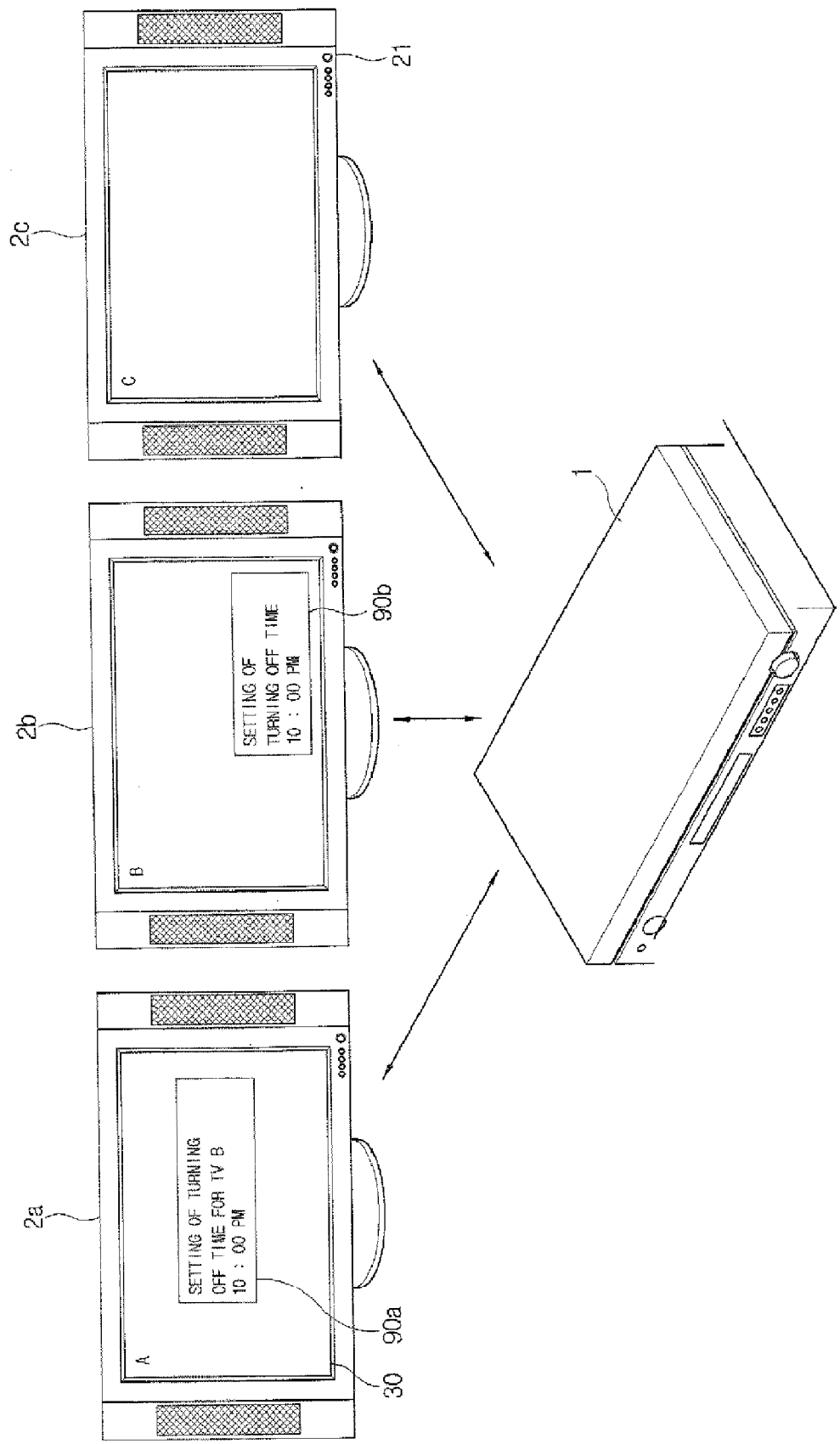
FIG. 3 is a block diagram illustrating a configuration of a display system according to an exemplary embodiment of the present invention.

FIG. 3 illustrates a display system according to an exemplary embodiment of the present invention. As shown in FIG. 3, the display system according to an exemplary embodiment of the present invention comprises the video signal receiving apparatus 1 and a plurality of display devices 2*a*, 2*b* and 2*c*.

The control part 22 of the video signal receiving apparatus 1 transmits a video signal received by the receiving part 14*a* to the plurality of display devices 2*a*, 2*b* and 2*c*. If a user of a display device 2*a* intends to change a video display property of an external display device 2*b*, the control part 40 of the display device 2*a* controls the video processing part 32 to display a UI 90*a* for control data input.

For example, if a user of the display device 2*a* intends to change a turning off time of the external display device 2*b*, the user inputs the turning off time through the user input part 36 after displaying a UI image for input of the turning off time in the display part 30 according to an order of the user. The control part 40 of the display device 2*a* transmits information about the input turning off time and information about the corresponding external display device 2*b* to change the turning off time, to the video signal receiving apparatus 1 through the communicating part 34. Here, the control part 40 may collectively transmit control data to all external display devices 2*b* and 2*c* according to an order of a user.

If the control part 22 of the video signal receiving apparatus 1 receives the information about the turning off time from the display device 2*a* through the communicating part 16*a*, the control part 22 transmits information about the changed turning off time to the corresponding external display device 2*b* to be changed. As described above, if a user inputs information related to a property of all external display devices 2*b* and 2*c*, the control part 22 may control communicating parts 16*b* and 16*c* to transmit the information on the property to all external display devices 2*b* and 2*c*.

If the control part 40 of the external display device 2*b* receives the information about the changed turning off time from the communicating part 34, the control part 40 sets or changes the turning off time, and controls the video processing part 32 to display a UI image 90*b* in the display part 30 displaying the information on the changed property. Accordingly, the display device 2*a* can easily change a property of video displayed in the external display device 2*b*.

Here, the turning off time among the video display property is used for exemplary description. Alternatively, the video display property may comprise a view rate, channel information and other changeable properties related to a video display.

Also, if the view rate is set, the control part 40 may control an indicating part 21 to emit light if the view rate of a video signal received through the communicating part 34 is not permissible to the view rate of a user.

The control part 40 may generate a UI for inputting information of a user ID and a password, and may control the video processing part 32 to display the generated UI in the display part 30. Accordingly, a user is endowed with a right to change a video display property, and the user endowed with the right to change can add or delete a property as well as change a property.

Hereinafter, an information updating method of a display device according to an exemplary embodiment of the present invention will be described by referring to FIG. 4.

Figure 4:
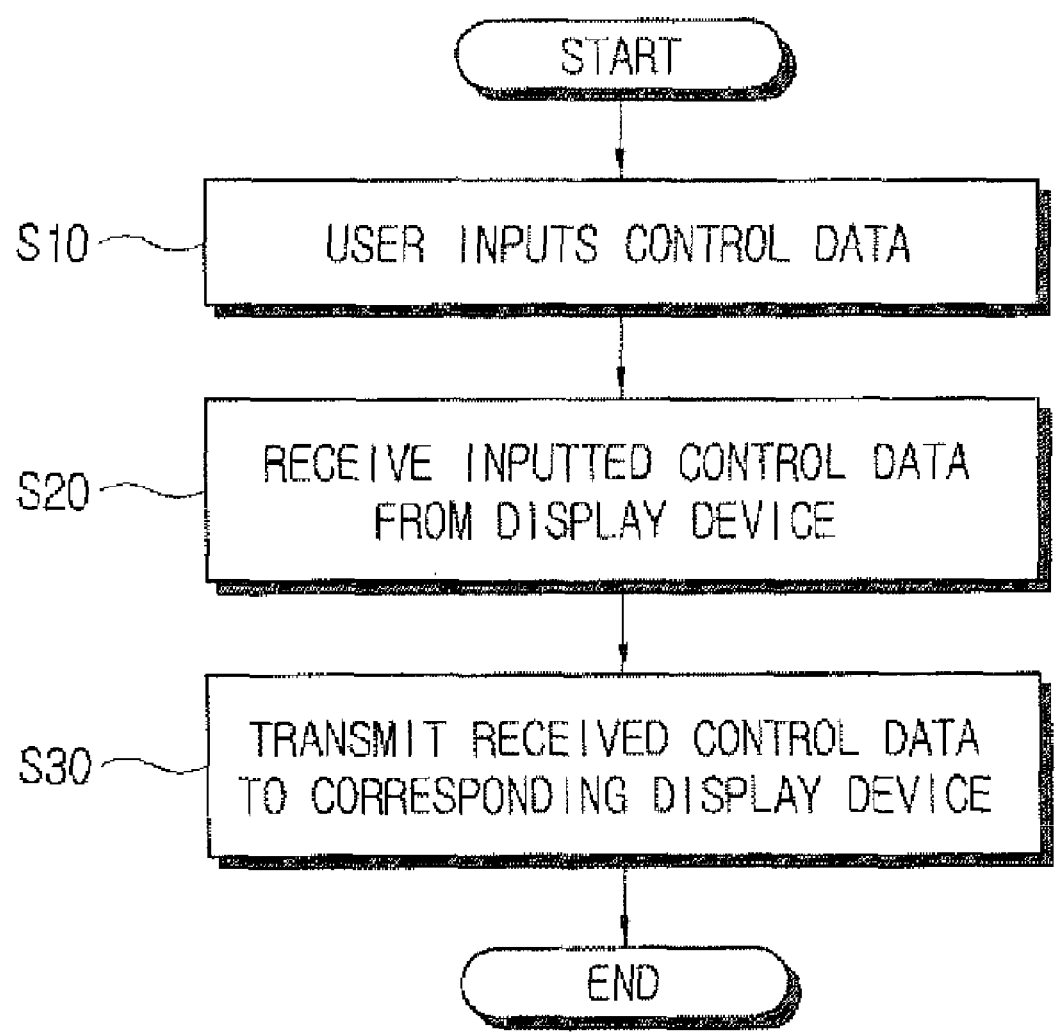
FIG. 4 is a flowchart illustrating an information updating method of the display system according to an exemplary embodiment of the present invention.

As shown in FIG. 4, the control part 40 of the display device 2*a* receives control data to display a video signal with a changed property by a user input (S10). In S10, if the control data is input, the control part 40 of the display device 2*a* transmits the input control data to the video signal receiving apparatus 1 through the communicating part 34, and the control part 22 of the video signal receiving apparatus 1 receives the control data through the communicating part 16*a* (S20).

In S20, if the control data is received, the control part 22 of the video signal receiving apparatus 1 transmits the received control data to a corresponding display device 2*b* through the communicating part 16*b* (S30). Accordingly, the display device 2*a* can easily change property of video displayed in an external display device 2*b*.

As described above, the present invention provides a video signal receiving apparatus, a display device, a display system and an information updating method of a display system transmitting a video signal to a plurality of display devices through a single video signal receiving apparatus, and easily changing various properties of an external remote display device.

Also, according to an exemplary embodiment of the present invention, a display device can display operations of other display devices and information such as a view rate, a channel number, etc. about video displayed in the other display devices. Also, power, setting of a display property, etc. of other display devices can be easily changed.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video signal receiving apparatus comprising:
a plurality of receiving parts which receive a video signal;
a plurality of communicating parts each of which corresponds to a unique external display device, and each of which separately transmits the video signal to each of the plurality of unique external display devices, and transmits and receives control data for changing a display property of the video signal and a setting of the display devices to and from the external display devices; and
a control part which controls the communicating parts to transmit the video signal received by the receiving parts to the external display devices, and to receive the control data and to transmit a signal which controls corresponding display devices if the control data is input from the external display devices,
wherein the control data is received from a first external display device of the plurality of external display devices to control a setting or display property of the video signal of a second external display device of the plurality of external display devices.

2. The video signal receiving apparatus according to claim 1, wherein the communicating parts transmit and receive the control data via a wireless local area network.

3. The video signal receiving apparatus according to claim 1, further comprising:
a display part;
a user interface generating part which generates a user interface for input of the control data and a display of a state of the display part; and
a video processing part which performs a video process to the user interface generated by the user interface generating part,
wherein the control part controls the video processing part so that the control data can be input through the user interface.

4. The video signal receiving apparatus according to claim 1, further comprising an indicating part,
wherein the control part controls the indicating part to indicate a permission for view according to a view rate, and
the display property of the video signal is the view rate.

5. The video receiving apparatus of claim 1, wherein the changing the display property of the video signal and the setting of the display devices is done via a user interface displayed on at least one of the plurality of external devices.

6. The video signal receiving apparatus according to claim 1, wherein the first external display device transmits to the video signal receiving apparatus information about the second external display device of which the setting or the display property of the video signal is controlled based on the control data.

7. A display device comprising:
a display part;
a communicating part which receives a video signal from a video signal receiving apparatus, and transmits and receives control data for changing a display property of the video signal and a setting of the display part to and from the video signal receiving apparatus;
a video processing part which performs a video process on the received video signal to output video in the display part; and
a control part which controls the communicating part and the video processing part to transmit the input control data to the video signal receiving apparatus if the control data is input, and to perform a video process depending on the control data if the control data input from an external display device is received from the video signal receiving apparatus,
wherein the control data is received from a first external display device of a plurality of external display devices to control a setting or display property of the video signal of a second external display device of the plurality of external display devices.

8. The display device according to claim 7, wherein the communicating part transmit and receive the control data via a wireless local area network.

9. The display device according to claim 7, further comprising a user input part,
wherein the control part controls the user input part to receive the control data.

10. The display device according to claim 9, further comprising a user interface generating part which generates a user interface for an input of the control data,
wherein the control part enables the control data to be input through the user interface.

11. The display device according to claim 9, wherein the control part enables an input of the control data according to information of an identifier and a password through the user input part.

12. The display device according to claim 7, further comprising an indicating part,
wherein the control part controls the indicating part to indicate a permission for view according to a view rate, and
the display property of the video signal is the view rate.

13. The display device according to claim 7, wherein the first external display device transmits to the video signal receiving apparatus information about the second external display device of which the setting or the display property of the video signal is controlled based on the control data.

14. A display system comprising a video signal receiving apparatus and a plurality of display devices,
wherein the video signal receiving apparatus comprises:
a plurality of receiving parts which receive a video signal;
a plurality of first communicating parts which transmit the video signal to the display devices, and transmit and receive control data for changing a display property of the video signal and a setting of the display devices to and from the display devices; and
a first control part which controls the first communicating parts to transmit the video signal received by the receiving parts to the display devices, and to receive the control data and to transmit a signal which controls corresponding display devices if the control data is input from the display devices, and
wherein each of the display devices comprises:
a display part;
a second communicating part which receives the video signal from the video signal receiving apparatus, and transmits and receives the control data for changing the display property of the video signal and a setting of the display part to and from the video signal receiving apparatus;

a video processing part which performs a video process on the received video signal to output video in the display part; and a second control part which controls the second communicating part and the video processing part to transmit the input control data to the video signal receiving apparatus if the control data is input, and to perform a video process depending on the control data if the control data input from an external display device is received from the video signal receiving apparatus, wherein the control data is received from a first external display device of a plurality of external display devices to control a setting or display property of the video signal of a second external display device of the plurality of external display devices.

15. The display system according to claim 14, wherein the first external display device transmits to the video signal receiving apparatus information about the second external display device of which the setting or the display property of the video signal is controlled based on the control data.

16. A display system comprising:
a video signal receiving apparatus; and
a plurality of display devices,
wherein the video signal receiving apparatus comprises:
a plurality of receiving parts which receive a video signal;
a plurality of first communicating parts which transmit the video signal to the display devices, and transmit and receive control data for changing a display property of the video signal and a setting of the display devices to and from the display devices;
a first control part which controls the first communicating parts to transmit the video signal received by the receiving parts to the display devices, and to receive the control data and to transmit a signal which controls corresponding display devices if the control data is input from the display devices; and
a first indicating part, wherein the first control part controls the first indicating part to indicate a first permission for view according to a view rate, and
wherein each of the display devices comprise:
a display part;
a second communicating part which receives a video signal from the video signal receiving apparatus, and transmits and receives the control data for changing the display property of the video signal and a setting of the display part to and from the video signal receiving apparatus;
a video processing part which performs a video process on the received video signal to output video in the display part;
a second control part which controls the second communicating part and the video processing part to transmit the input control data to the video signal receiving apparatus if the control data is input, and to perform a video process depending on the control data if the control data input from an external display device is received from the video signal receiving apparatus; and a second indicating part, wherein the second control part controls the second indicating part to indicate a second permission for view according to the view rate, and
the display property of the video signal is the view rate, wherein the control data is received from a first external display device of a plurality of external display devices to control a setting or display property of the video signal of a second external display device of the plurality of external display devices.

17. The display system according to claim 16, wherein the first external display device transmits to the video signal receiving apparatus information about the second external display device of which the setting or the display property of the video signal is controlled based on the control data.

18. An information updating method of a display system comprising a video signal receiving apparatus, and a plurality of display devices comprising a display part; comprising:
inputting control data to change a display property of a video signal in the display devices;
receiving the input control data from the display devices in the video signal receiving apparatus; and
transmitting the received control data to corresponding display devices from the video signal receiving apparatus,
wherein the control data is received from a first external display device of a plurality of external display devices to control a setting or display property of the video signal of a second external display device of the plurality of external display devices.

19. The information updating method of the display system according to claim 18, wherein the control data is transmitted and received via a wireless local area network.

20. The information updating method of the display system according to claim 18, wherein the inputting of the control data further comprises displaying a user interface for input of the control data,
wherein the control data is input through the user interface.

21. The information updating method of the display system according to claim 18, wherein the inputting of the control data further comprises inputting by information of a user identifier (ID) and a password,
wherein the control data is input according to the input information of the ID and password.

22. The information updating method of the display system according to claim 18, wherein the first external display device transmits to the video signal receiving apparatus information about the second external display device of which the setting or the display property of the video signal is controlled based on the control data.

* * * * *